United States Patent
De Lamberterie

(10) Patent No.: US 11,938,860 B2
(45) Date of Patent: Mar. 26, 2024

(54) LIGHTING DEVICE FOR MOTOR VEHICLE INCORPORATING A SCREEN

(71) Applicant: VALEO VISION, Bobigny (FR)

(72) Inventor: Antoine De Lamberterie, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/792,497

(22) PCT Filed: Jan. 15, 2021

(86) PCT No.: PCT/EP2021/050861
§ 371 (c)(1),
(2) Date: Jul. 13, 2022

(87) PCT Pub. No.: WO2021/144453
PCT Pub. Date: Jul. 22, 2021

(65) Prior Publication Data
US 2023/0057046 A1 Feb. 23, 2023

(30) Foreign Application Priority Data
Jan. 17, 2020 (FR) ........................... 2000432

(51) Int. Cl.
*B60Q 1/26* (2006.01)
*B60Q 1/50* (2006.01)
(Continued)

(52) U.S. Cl.
CPC ............. *B60Q 1/2607* (2013.01); *B60Q 1/50* (2013.01); *B60Q 1/5035* (2022.05); *F21S 43/14* (2018.01); *F21S 43/50* (2018.01)

(58) Field of Classification Search
CPC ........... B60Q 1/2607; B60Q 1/50–5037; F21S 43/14–145; F21S 43/50
See application file for complete search history.

(56) References Cited

U.S. PATENT DOCUMENTS

| 6,250,788 B1 | 6/2001 | Muller |
| 10,079,264 B2 * | 9/2018 | Zhang .................... H01L 23/29 |

(Continued)

FOREIGN PATENT DOCUMENTS

| CN | 109802018 A | 5/2019 |
| JP | 2019001398 A | 1/2019 |

(Continued)

OTHER PUBLICATIONS

European Patent Office, International Search Report (with English translation) and Written Opinion of corresponding International Application No. PCT/EP2021/050861, dated Apr. 29, 2021.

*Primary Examiner* — Jason M Han
(74) *Attorney, Agent, or Firm* — Valeo Vision

(57) ABSTRACT

Lighting device for a motor vehicle with a first plurality of selectively activatable light sources and a second plurality of light sources. The first and second pluralities of light sources being arranged on a common substrate and each light source of the first plurality being positioned at a distance from the other light sources of the first plurality of less than 1 mm. The lighting device includes an optical element having a first region positioned facing the first plurality of light sources and a second region positioned facing the second plurality of light sources, with the second region being provided with optical patterns.

12 Claims, 3 Drawing Sheets

(51) Int. Cl.
*F21S 43/14* (2018.01)
*F21S 43/50* (2018.01)

(56) References Cited

U.S. PATENT DOCUMENTS

| | | | |
|---|---|---|---|
| 10,378,714 B2* | 8/2019 | Kim | F21S 41/20 |
| 10,795,250 B2* | 10/2020 | Yokobayashi | G03B 21/204 |
| 2011/0156894 A1 | 6/2011 | Lin et al. | |
| 2015/0211714 A1* | 7/2015 | Ng | H01L 33/54 |
| | | | 362/268 |
| 2017/0254518 A1 | 9/2017 | Vasylyev | |
| 2017/0341571 A1 | 11/2017 | Salter et al. | |
| 2018/0339643 A1* | 11/2018 | Kim | F21S 41/663 |
| 2019/0273072 A1* | 9/2019 | Rohm | F21S 43/14 |
| 2020/0313046 A1 | 10/2020 | Tian et al. | |
| 2021/0151626 A1* | 5/2021 | Dohner | H01L 27/156 |

FOREIGN PATENT DOCUMENTS

| | | | |
|---|---|---|---|
| KR | 20140079932 A | | 6/2014 |
| KR | 20190104664 A | | 9/2019 |
| WO | 2019155243 A1 | | 8/2019 |
| WO | 2019158759 A1 | | 8/2019 |

* cited by examiner

[Fig. 1]
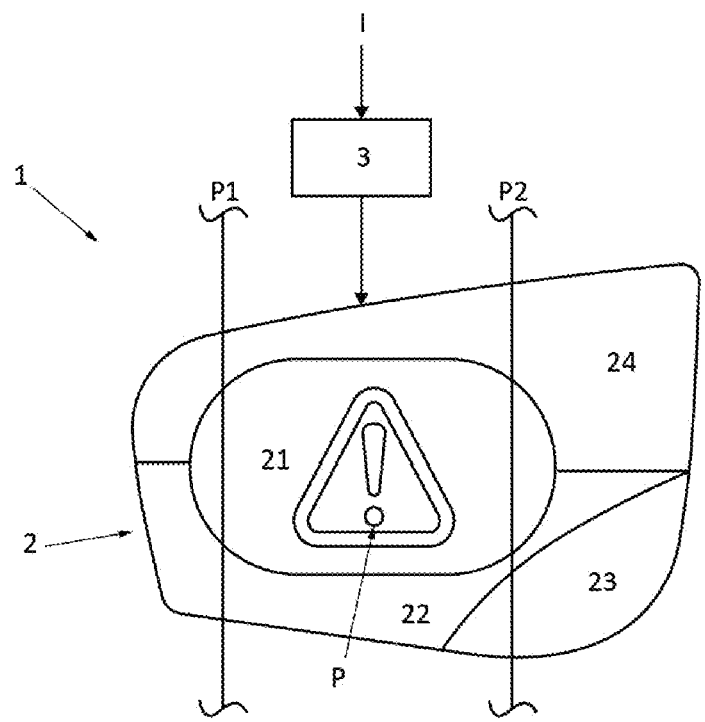

[Fig. 2]
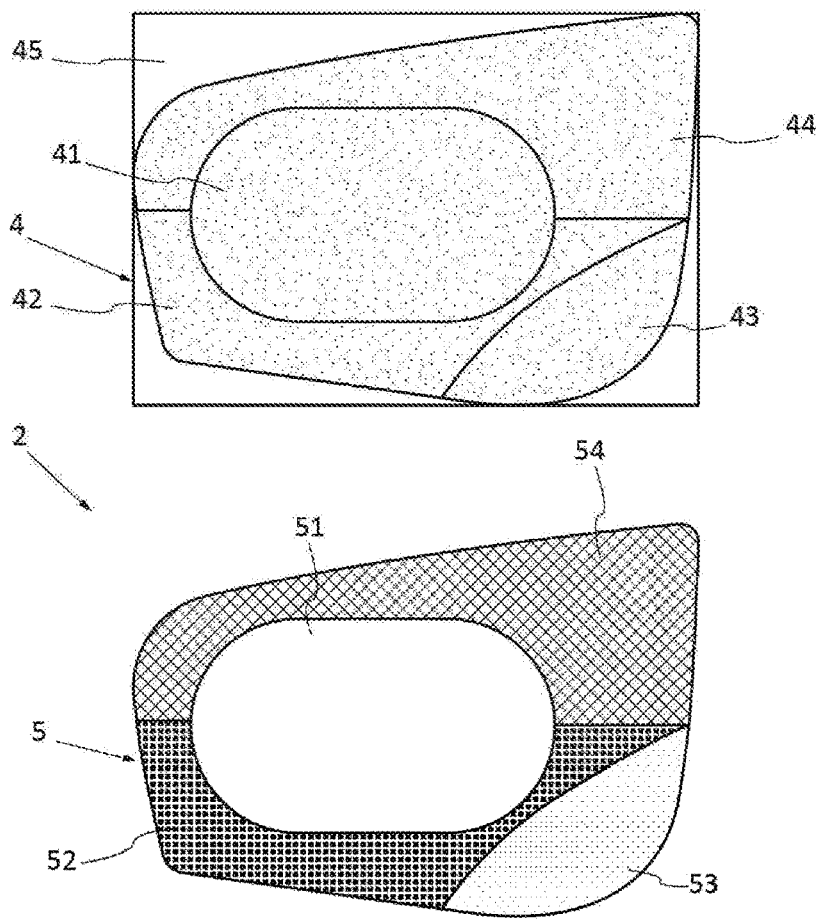
[Fig. 3]
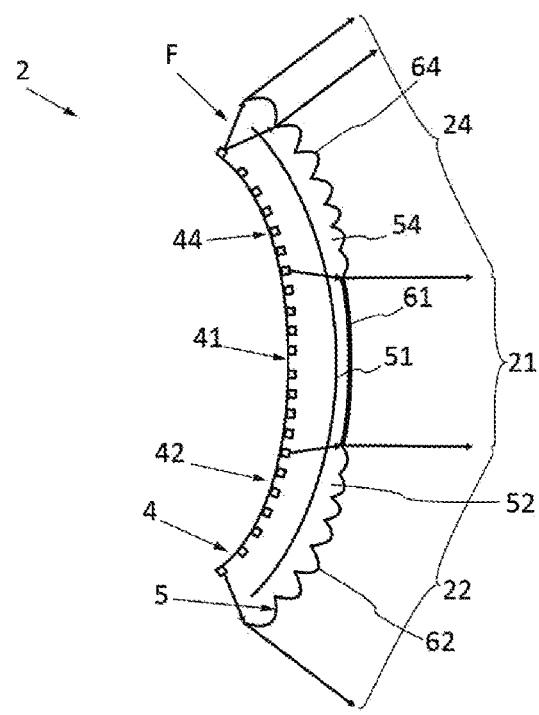

[Fig. 4]
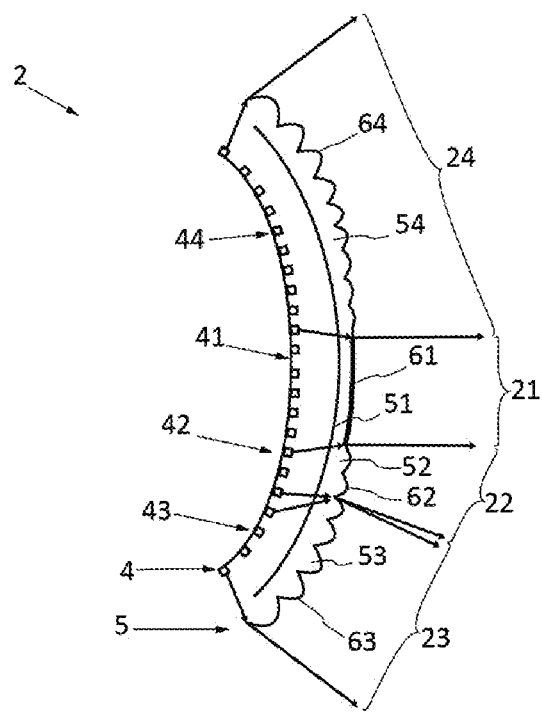

LIGHTING DEVICE FOR MOTOR VEHICLE INCORPORATING A SCREEN

CROSS-REFERENCE TO RELATED APPLICATIONS

This application is filed under 35 U.S.C. § 371 U.S. National Phase of International Application No. PCT/EP2021/050861 filed Jan. 15, 2021 (published as WO2021144453), which claims priority benefit to French application No. 2000432 filed on Jan. 17, 2020, the disclosures of which are herein incorporated by reference in their entirety.

TECHNICAL FIELD

The invention relates to the field of motor-vehicle lighting. More precisely, the invention relates to the field of screen-based motor-vehicle signaling.

BACKGROUND OF THE INVENTION

It is known to embed in a motor-vehicle lighting device, and more particularly in a motor-vehicle light-emitting signaling device, a screen in order to display information intended for the road user, such as for example a pictogram indicating that a door is opening or the presence of a slowdown ahead of the vehicle.

BRIEF SUMMARY OF THE INVENTION

In order to produce this screen, it is also known to use light sources of small size having no encapsulation, and in particular having no casings encapsulating these sources, such as for example microLEDs. These two features make it possible to produce a compact screen, with a high resolution and sufficient luminance for the information displayed on the screen to be visible to a road user, day and night.

Nevertheless, this screen alone does not make it possible to perform all the regulatory photometric functions which must be performed by a signaling device. Specifically, regulations govern the signaling functions that must be performed by a front or rear signaling device, such as a brake light, a position light or even a direction indicator. Although regulations differ from one country to another, these regulations define, among other things, minimum light intensities that the signaling functions must achieve. For example, European regulations impose a minimum of 30 000 Cd/m² for a brake light and a minimum of 70 000 Cd/m² for a direction indicator for visible areas of these functions of around 25 cm². However, a screen of the type described above only makes it possible to achieve an intensity of 5000 Cd/m² at most. It is therefore necessary to provide in the signaling device other light sources that make it possible to perform these various regulatory signaling functions.

Furthermore, it is known to mount the light sources forming the screen on a substrate that makes it possible to selectively activate each of the sources. However, this type of substrate has a generally rectangular standard shape, which imposes a specific shape on the screen. There is a need though to be able to produce screens for signaling devices which are of free form, and not necessarily rectangular.

Finally, the juxtaposition of a screen with other lighting or signaling functions in a lighting device is made complex by the need to observe a space between the screen and the neighboring functions. This space may thus create a break in the overall esthetic appearance of the lighting device and increases the size of the lighting device.

The invention falls within this context, and aims to meet the various needs explained above, by providing a lighting device for a motor vehicle, which incorporates a screen whose shape is not constrained by the technology constituting the screen, and which makes it possible to perform in addition to the screen at least one regulatory photometric function without creating a break in the esthetic appearance or increasing the size of the lighting device.

To these ends, the subject of the invention is a lighting device for a motor vehicle, comprising a first plurality of selectively activatable light sources, and a second plurality of light sources, the first and second pluralities of light sources being arranged on a common substrate and each light source of the first plurality being positioned at a distance from the other light sources of the first plurality of less than 1 mm, characterized in that the lighting device comprises an optical element having a first region positioned facing the first plurality of light sources and a second region positioned facing the second plurality of light sources, the second region being provided with optical patterns.

It will be understood that by virtue of the invention, on the one hand, there is a first plurality of light sources which are positioned sufficiently close to each other so as to produce, via the first region of the optical element, a screen. In addition, there is a second plurality of light sources whose light distribution may be spread judiciously by means of the optical patterns of the second region to perform a regulatory photometric function, in particular in terms of minimum light intensities. Moreover, the common substrate may retain its standard shape, the shape of the screen being itself defined by the positioning of the first plurality of light sources on this substrate and by the shape of the first region, which may both be free. Finally, the positioning of the light sources on one and the same substrate makes it possible to avoid a break in the esthetic appearance of the lighting device between the screen and the regulatory photometric function and to avoid increasing the size of the device.

Advantageously, the optical element is a single-piece part. If desired, the distance from the optical element to each of the light sources of the first and second pluralities of light sources may be less than 1 millimeter.

In one exemplary embodiment, the first region is a central region of the optical element, and the second region is a peripheral region of the optical element extending over all or part of the perimeter of the central region. If desired, the second region may be composed of a plurality of sub-regions, each sub-region being positioned facing a separate group of light sources of the second plurality of light sources. Where appropriate, the light sources of the first plurality of light sources are arranged in an arrangement that corresponds to the shape of the first region.

By "optical patterns" what is in particular meant is one or more of the following elements: gadroons, for example of cylindrical profile; collimators, for example lens collimators and/or total-internal-reflection collimators; prisms. If desired, the optical patterns may be positioned on an entrance face of the optical element, which face is oriented toward the light sources and/or an exit face of the optical element, which face is oriented toward the outside of the device. For example, the profile of each optical pattern may be defined according to the curvature and/or the inclination of the optical element.

Advantageously, each light source of the first plurality of light sources has dimensions of less than 500 micrometers and the light sources of the first plurality of light sources are separated from each other by a distance of less than 1 millimeter. By "dimension of a light source" what is meant is the width and/or the length of the light-emitting surface of the light source. Preferably, the dimensions of all the light sources of the first plurality of light sources are identical. By way of example, each light source of the first plurality of light sources may be a semiconductor light-emitting unit having dimensions between 100 and 300 micrometers. As a variant, each light source of the first plurality of light sources may be a semiconductor light-emitting unit having dimensions of less than 100 micrometers, and in particular comprised between 30 and 60 micrometers. Where appropriate, the light sources of the first plurality of light sources may be uniformly arranged on the common substrate, for example with a pitch of less than or equal to 800 micrometers, or even of less than or equal to 300 micrometers. Preferably, each light source of the first plurality of light sources has no encapsulation at all, for example incorporating a connector or an optical element, and is directly mounted on and connected to the common substrate.

In one embodiment of the invention, the light sources of the second plurality of light sources have the same features as the light sources of the first plurality of light sources. By "features" what is in particular meant are the dimensions and the internal structure of the light sources, as well as the arrangement pitch and the fact that each light source of the second plurality of light sources is selectively activatable. As a variant, provision could be made for the light sources of the second plurality of light sources to differ from the light sources of the first plurality of light sources in at least one feature and in particular one of the features mentioned above. For example, provision could be made for the light sources of the second plurality of light sources to be segmented into various selectively activatable groups or even for these light sources to only be activatable simultaneously.

Advantageously, the ratio between the distance separating two light sources of the second plurality of light sources and a dimension of each light source of the second plurality of light sources is greater than or equal to 2. This ratio is called the distance ratio. Preferably, the distance ratio may be greater than or equal to 5. As a variant, the area fill ratio, also called fill factor, namely the distance separating two light sources of the second plurality of light sources squared divided by the area of each light source of the second plurality of light sources, may be greater than or equal to 25.

Advantageously, the common substrate is an active matrix substrate arranged to selectively control each of the light sources of the first plurality of light sources, each of the light sources of the first plurality of light sources being mounted on and connected to the common substrate by means of a thin-film transistor integrated into the common substrate. Where appropriate, the active matrix substrate is also arranged to selectively control each of the light sources of the second plurality of light sources. If desired, the common substrate may be curved or flexible.

Advantageously, each optical pattern of the second region is arranged to receive the light rays emitted by one of the light sources of the second plurality of light sources and to concentrate these light rays along a given emission axis. For example, each optical pattern may have a profile that is shaped so as to modify the distribution of the light rays emitted by said light source, in particular a Lambertian distribution of these rays emitted by said light source, so as to obtain a luminance greater than that of said light source. This feature is particularly advantageous when the distance ratio is greater than or equal to two or when the fill factor is greater than or equal to four, insofar as the apparent luminance output from an optical pattern, that is to say the apparent luminance for an observer located at a distance from the lighting device, is proportional to the luminance of the source multiplied by the square of the fill factor. If desired, each optical pattern may have a profile that is shaped so as to spread the light rays emitted by said light source in a horizontal direction, in particular when said light source has a substantially square light-emitting surface.

Advantageously, the first region is scattering. For example, the first region comprises a graining, in particular on a face that is oriented toward the outside of the lighting device. This feature makes it possible to obscure the visible appearance of the light sources of the first plurality of light sources through the first region of the optical element, in particular when the spacing pitch of the light sources is too large. As a variant, the first region may be smooth, for example when the spacing pitch is less than 800 micrometers, or even less than 500 micrometers.

If desired, the first region may be coated with an anti-reflection coating. Potentially, the second region may be coated with an anti-reflection coating. This feature makes it possible to reduce the influence of a light source on the visible appearance of a pixel which is created by a neighboring light source.

Advantageously, each light source of the first plurality of light sources has dimensions of less than 500 micrometers and the light sources of the first plurality of light sources are separated from each other by a distance of less than 1 millimeter, and the distance ratio of the second plurality of light sources is greater than 2 and/or the area fill ratio of the second plurality of light sources is greater than or equal to four, and each optical pattern of the second region is arranged to receive the light rays emitted by one of the light sources of the second plurality of light sources and to concentrate these light rays along a given emission axis, while the first region is scattering or smooth.

Advantageously, the lighting device comprises a control unit arranged to selectively control the light sources of the first plurality of light sources such that the lighting device forms a screen in the first region of the optical element, the control unit being arranged to control the light sources of the second plurality of light sources such that the lighting device emits at least one light beam as output from the second region of the optical element that participates in the performance of a predetermined regulatory signaling function. In other words, the light rays which may be emitted by one of the light sources of the first plurality of light sources form a pixel of the screen. In addition, the light rays emitted by the light sources of the second plurality of light sources and deflected by the optical patterns together form at least one light beam performing all or part of a predetermined regulatory signaling function. Preferably, the control unit is arranged to receive instructions from a computer of the motor vehicle and to control the light sources of the device according to said instructions, for example so as to display a pictogram on the screen and/or to produce a position light, a brake light and/or a direction indicator. In the case where the second region is composed of a plurality of sub-regions, each positioned facing a separate group of light sources of the second plurality of light sources, the control unit may be arranged to selectively control each of said groups such that each group emits a light beam which is deflected by the optical patterns of the associated sub-region to perform a separate predetermined regulatory signaling function.

BRIEF DESCRIPTION OF THE DRAWINGS

The present invention will now be described by way of examples that are merely illustrative and that in no way limit the scope of the invention, and with reference to the accompanying illustrations, in which:

FIG. 1 shows a front view of a lighting device according to one embodiment of the invention;

FIG. 2 shows various elements composing the lighting device of FIG. 1;

FIG. 3 shows a cross-sectional view along a first plane of the lighting device of FIG. 1;

FIG. 4 shows a cross-sectional view along a second plane of the lighting device of FIG. 1.

DETAILED DESCRIPTION OF THE INVENTION

In FIG. 1 a lighting device 1 for a motor vehicle comprising a taillight 2 has been shown.

The taillight 2 is segmented into a plurality of sections each performing one or more given functions. In the example described, the taillight 2 is segmented into a central section producing a screen 21; a bottom-left peripheral section producing a direction indicator 22; a bottom-right peripheral section producing a rear fog light 23; and an upper peripheral section participating alternately in the production of a position light and of a brake light 24.

The lighting device 1 also comprises a control unit 3 arranged to receive instructions I sent by a central computer of the motor vehicle and to control, according to said instructions I, the switching on and/or switching off of said various mentioned functions as well as the display of a pictogram P on the screen 21.

The structure of the taillight 2 will now be described, in conjunction with FIG. 2.

The taillight 2 comprises, on one side, a first plurality of light sources 41 intended to produce the screen 21 and a second plurality of light sources segmented into groups 42, 43 and 44, each intended to perform the functions of a direction indicator 22, of a rear fog light 23 and of a position light/brake light 24, respectively.

The first and second pluralities of light sources are arranged on a common substrate 4.

In the example described, all the light sources of the first plurality 41 are microLEDs, namely semiconductor light-emitting units having no encapsulation and whose dimensions, namely length and width, are 60 micrometers. These units are arranged on the common substrate 4 in a matrix and are uniformly spaced apart by a pitch of 300 micrometers. It will be noted that the distance ratio of the light sources of the first plurality 41, namely the ratio between the spacing pitch of these light sources and a dimension of these light sources, may be between 3 and 8.

The light sources of the second plurality 42, 43, 44 are also microLEDs whose dimensions and arrangement on the common substrate 4 are identical to those of the light sources of the first plurality 41. It will be noted that these sources may differ depending on the section of the taillight that they are intended to produce, in particular in terms of color of the light rays that they emit or in terms of dimensions and of spacing pitch. Specifically, the signaling functions mentioned above are subject to regulatory requirements in terms of color. For example, the direction-indicator function must be performed by a light beam of amber color, while the functions of position light and of brake light must be performed by light beams of red color. The use of the following could therefore be envisaged:

a. microLEDs directly emitting light rays whose color corresponds to that required for the section that they are intended to produce, b. microLEDs of small dimensions and which are arranged with a smaller pitch with respect to those of the screen, these microLEDs emitting light rays of different colors such that neighboring microLEDs together emit light rays whose color corresponds, by additive synthesis, to that required for the section that they are intended to produce;

c. microLEDs emitting light rays whose color is subsequently modified by a filter.

It will be noted with reference to FIG. 2 that the arrangements of the first plurality 41 and of the various groups 42, 43 and 44 of the second plurality correspond to the shapes of the various sections 21, 22, 23 and 24, all of the light sources nevertheless forming a single assembly arranged on the common substrate 4, the corners 45 of the common substrate having no light source at all.

The common substrate 4 is a rectangular and flexible active matrix substrate. Each of the light sources of first and second pluralities is mounted on and connected to the common substrate 4 by means of a thin-film transistor (TFT) integrated into the common substrate. This type of substrate makes it possible to selectively control each of the light sources, by means of the control unit 3, it being understood that, in the example described, the light sources of one and the same group 42, 43 or 44 are controlled together to control the switching on and/or switching off of the function that they are intended to perform while the light sources of the first plurality 41 are selectively controlled to each form one pixel of the screen 21 making it possible to display the pictogram P on the screen 21. As a variant, provision will possibly be made for each of the light sources of the groups 42, 43, 44 to be selectively controlled, for example to perform dynamic lighting functions.

Since the substrate 4 is flexible, the corners 45 may be folded toward the rear of the taillight 2 so that they are hidden from the view of a user located outside the motor vehicle.

The taillight 2 further comprises an optical element 5, in the form of a single-piece, transparent or translucent part, positioned facing the common substrate 4 at a distance of 500 micrometers so as to receive the light emitted by the light sources.

More specifically, the optical element 5 is segmented into a first, central region 51 and into a second, peripheral region itself composed of sub-regions 52, 53 and 54.

The first, central region 51 is positioned facing the first plurality of light sources 41 and its shape substantially corresponds to that of the arrangement of these light sources and to that of the section 21. Likewise, each of the sub-regions 52, 53 and 54 is positioned facing one of the groups 42, 43 and 44, respectively, of the second plurality of light sources.

FIG. 3 and FIG. 4 show cross sections of the taillight 2 along vertical planes P1 and P2 that are shown in FIG. 1, making it possible to understand the structure and the functioning of these first and second regions.

The first, central region 51 is provided with a graining 61 on the exit face thereof, namely the face thereof that is oriented toward the outside of the taillight 2. This graining makes it possible to diffuse the light emitted by the light sources of the first plurality 41, such as to prevent the spacing between these light sources from being seen by a user located outside the motor vehicle. Furthermore, the first, central region 51 is provided with an anti-reflection coating making it possible to prevent the light emitted by one of the light sources of the first plurality 41 from impairing the appearance of the pixel that is formed by a neighboring light source.

Each sub-region 52, 53 and 54 of the optical element 5 comprises optical patterns 62, 63 and 64 formed on an exit face of this sub-region.

Each optical pattern 62, 63 or 64 of a sub-region 52, 53 or 54 is arranged to receive the light rays F emitted by one of the light sources of the group 42, 43 or 44 that is associated with this sub-region and to concentrate these light rays F such that the apparent luminance output from said optical pattern is greater than the luminance of said light source.

In the example described, each optical pattern 62, 63 and 64 thus associated with one of the light sources of the groups 42, 43 or 44 is a gadroon of toric surface, that is to say having one curvature in one direction and another curvature in another direction, which is determined as a function in particular of the distance of said associated light source to the optical element 5, of the curvature of the optical element 5 plumb with said light source, and of the signaling function 22, 23 and 24 intended to be performed by the group to which said light source belongs.

It is thus ensured that each of the light beams that are produced by the light rays F of the light sources of each of the groups 42, 43 and 44 and that are deflected by the optical elements 62, 63 and 64 of the sub-regions 52, 53 and 54 complies with the regulatory requirements governing the functions 22, 23 and 24, in particular in terms of minimum light intensities.

It should be noted that the taillight 2 may comprise elements other than those shown, and in particular a casing and a closing outer lens that define a space in which the common substrate 4 and the optical element 5 are arranged.

The above description clearly explains how the invention makes it possible to achieve the objectives that were set therefor, namely, providing a lighting device for a vehicle incorporating a screen of free form, and which is further capable of performing one or more regulatory photometric functions, by making provision to position the light sources that are required for performance of these functions and for production of the screen on one and the same substrate, and by extending the optical element of the screen so that optical patterns can be added thereto that make it possible to deflect the emitted light and thus to comply with the regulatory requirements governing these photometric functions.

In any event, the invention should not be regarded as being limited to the embodiments specifically described in this document, and extends, in particular, to any equivalent means and to any technically operative combination of these means. It is particular possible to envision optical patterns with profiles or even of types other than those described, and in particular collimators, microlenses or even prisms.

What is claimed is:

1. A lighting device for a motor vehicle, comprising:
a first plurality of selectively activatable light sources,
a second plurality of light sources, with the first and second pluralities of light sources being arranged on a common substrate and each light source of the first plurality being positioned at a distance from the other light sources of the first plurality of less than 1 mm apart, and
an optical element having a first region configured to perform a first function positioned facing the first plurality of light sources and a second region configured to perform a second function positioned facing the second plurality of light sources, with the entire second region being provided with optical patterns on an exit face of the optical element and the first function being different than the second function.

2. The device as claimed in claim 1, wherein each light source of the first plurality of light sources has dimensions of less than 500 micrometers and in that the light sources of the first plurality of light sources are separated from each other by a distance of less than 1 millimeter.

3. The device as claimed in claim 1, wherein each light source of the second plurality of light sources has dimensions of less than 500 micrometers.

4. The device as claimed in claim 1, wherein the ratio between the distance separating two light sources of the second plurality of light sources and a dimension of each light source of the second plurality of light sources is greater than 2.

5. The device as claimed in claim 1, wherein the common substrate is an active matrix substrate arranged to selectively control each of the light sources of the first plurality of light sources, with each of the light sources of the first plurality of light sources being mounted on and connected to the common substrate by means of a thin-film transistor integrated into the common substrate.

6. The device as claimed in claim 1, wherein each optical pattern of the second region is arranged to receive the light rays emitted by one of the light sources of the second plurality of light sources and to concentrate these light rays along a given emission axis.

7. The device according to claim 1, wherein that the first region is scattering.

8. The device as claimed in claim 1, wherein the first region is coated with an anti-reflection coating.

9. The lighting device as claimed in claim 1, further comprising a control unit arranged to selectively control the light sources of the first plurality of light sources such that the lighting device forms a screen in the first region of the optical element, with the control unit being arranged to control the light sources of the second plurality of light sources such that the lighting device emits at least one light beam as output from the second region of the optical element that participates in the performance of a predetermined regulatory signalling function.

10. The device as claimed in claim 1, wherein the lighting device is a taillight.

11. The device as claimed in claim 1, wherein an entry face of the optical element is positioned above and separate from the first plurality of light sources and the second plurality of light sources.

12. The device as claimed in claim 1, wherein the first region includes a graining on the exit face.

* * * * *